(12) United States Patent
Chugh

(10) Patent No.: US 9,977,767 B2
(45) Date of Patent: May 22, 2018

(54) SYSTEMS AND METHODS FOR DISABLING OR EXPIRING HYPERLINKS

(71) Applicant: Disney Enterprises, Inc., Burbank, CA (US)

(72) Inventor: Rahul Chugh, San Jose, CA (US)

(73) Assignee: Disney Enterprises, Inc., Burbank, CA (US)

( * ) Notice: Subject to any disclaimer, the term of this patent is extended or adjusted under 35 U.S.C. 154(b) by 293 days.

(21) Appl. No.: 14/562,521

(22) Filed: Dec. 5, 2014

(65) Prior Publication Data

US 2016/0162450 A1    Jun. 9, 2016

(51) Int. Cl.
*G06F 17/22* (2006.01)
*G06F 17/30* (2006.01)

(52) U.S. Cl.
CPC ...... *G06F 17/2235* (2013.01); *G06F 17/2247* (2013.01); *G06F 17/30882* (2013.01)

(58) Field of Classification Search
CPC ............. G06F 17/2235; G06F 17/2241; G06F 17/30014
USPC .................................................. 715/205–208
See application file for complete search history.

(56) References Cited

U.S. PATENT DOCUMENTS

| | | | | |
|---|---|---|---|---|
| 5,935,210 A * | 8/1999 | Stark | ................... | G06F 17/3089 707/E17.116 |
| 6,601,066 B1 * | 7/2003 | Davis-Hall | ......... | G06F 17/3089 |
| 6,631,496 B1 * | 10/2003 | Li | ..................... | G06F 17/30884 707/999.01 |
| 6,834,372 B1 * | 12/2004 | Becker | .............. | G06F 17/30876 707/E17.112 |
| 7,032,124 B2 * | 4/2006 | Greenbaum | ...... | G06F 17/30067 707/999.001 |
| 7,689,667 B2 * | 3/2010 | Lal | .......................... | H04L 29/06 709/218 |
| 8,898,166 B1 * | 11/2014 | Navrides | ........... | G06F 17/30595 705/342 |
| 9,357,031 B2 * | 5/2016 | Keith, Jr. | ................ | H04L 63/10 |
| 2002/0131362 A1 * | 9/2002 | Callon | ................ | G06F 11/2294 370/216 |
| 2003/0131005 A1 * | 7/2003 | Berry | ................ | G06F 17/30864 |
| 2005/0071477 A1 * | 3/2005 | Evans | ................... | H04L 69/329 709/228 |

(Continued)

OTHER PUBLICATIONS

What is Social Bookmarking?; Jan. 3, 2013; Affilorama; pp. 1-2.*
Duration; Nov. 30, 2013; Merriam-Webster; 2 pages.*

*Primary Examiner* — Andrew R Dyer
(74) *Attorney, Agent, or Firm* — Farjami & Farjami LLP

(57) ABSTRACT

There is provided a client device including a memory storing a web browser and a database of disabled hyperlinks. The client device further includes a processor executing the web browser to receive a selection of a hyperlink from a user for navigating to a web page addressed by the hyperlink, and query the database to determine, after the selection, if the hyperlink is one of the disabled hyperlinks stored in the database. If the query determines that the hyperlink is not one of the disabled hyperlinks stored in the database, request the web page from a web page server hosting the web page, receive, in response to the request, an error code from the web page server hosting the web page, store the hyperlink in the database of the disabled hyperlinks, in response to receiving the error code, and disable the hyperlink, in response to receiving the error code.

16 Claims, 4 Drawing Sheets

(56) References Cited

U.S. PATENT DOCUMENTS

| | | | |
|---|---|---|---|
| 2006/0041531 A1* | 2/2006 | Provoost | G06F 17/3089 |
| 2006/0161591 A1* | 7/2006 | Huang | G06F 17/30864 |
| 2007/0180049 A1* | 8/2007 | Chtcherbatchenko | G06F 17/30011 |
| | | | 709/217 |
| 2008/0028446 A1* | 1/2008 | Burgoyne | H04L 63/0428 |
| | | | 726/6 |
| 2008/0195674 A1* | 8/2008 | Kim | G06F 17/30899 |
| 2008/0294640 A1* | 11/2008 | Yost | G06F 17/30029 |
| 2011/0072338 A1* | 3/2011 | Caldwell | G05B 19/41845 |
| | | | 715/205 |
| 2011/0087966 A1* | 4/2011 | Leviathan | G06F 17/30905 |
| | | | 715/745 |
| 2016/0162449 A1* | 6/2016 | Moore | G06F 17/2235 |
| | | | 715/208 |
| 2016/0162452 A1* | 6/2016 | Moore | G06F 17/2235 |
| | | | 715/205 |

* cited by examiner

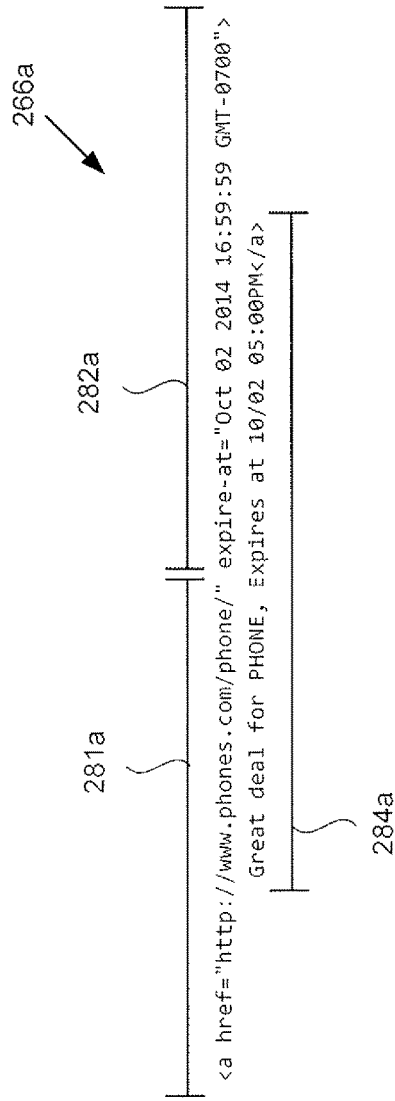
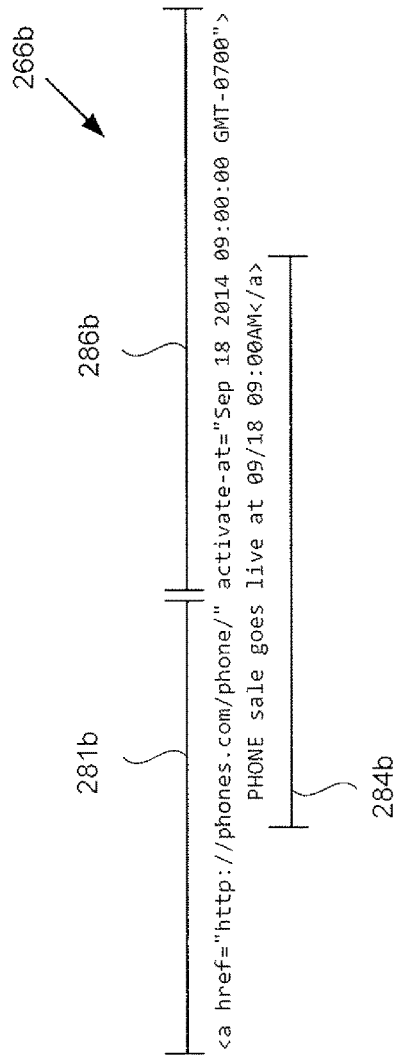

SYSTEMS AND METHODS FOR DISABLING OR EXPIRING HYPERLINKS

BACKGROUND

Since the creation of the World Wide Web, hyperlinks have been used to allow navigation from one web page to another without requiring a user to manually enter uniform resource locators (URLs) or uniform resource identifiers (URIs) into a web browser. Using HyperText Markup Language (HTML) for describing and creating web pages, a powerful feature called a hyperlink was created, which allows an easier way to navigate from one page to another. Hyperlinks allow a user to navigate to a specific web page in response to clicking the hyperlink in the email.

Today, hyperlinks are mostly static and do not include intelligence or awareness within their HTML code. As a result, sometimes when a user clicks on a hyperlink on a web page, the hyperlink navigates the user to a non-existent or an expired web page, for example. In order to replace or repair an expired hyperlink, the web page creator needs to manually disable or remove the hyperlink, which may take days.

SUMMARY

The present disclosure is directed to systems and methods for disabling or expiring hyperlinks, substantially as shown in and/or described in connection with at least one of the figures, as set forth more completely in the claims.

BRIEF DESCRIPTION OF THE DRAWINGS

FIG. 2A presents an example of a hyperlink HTML code, according to one implementation of the present disclosure.

FIG. 2B presents another example of a hyperlink HTML code, according to one implementation of the present disclosure.

DETAILED DESCRIPTION OF THE INVENTION

Figure 1:
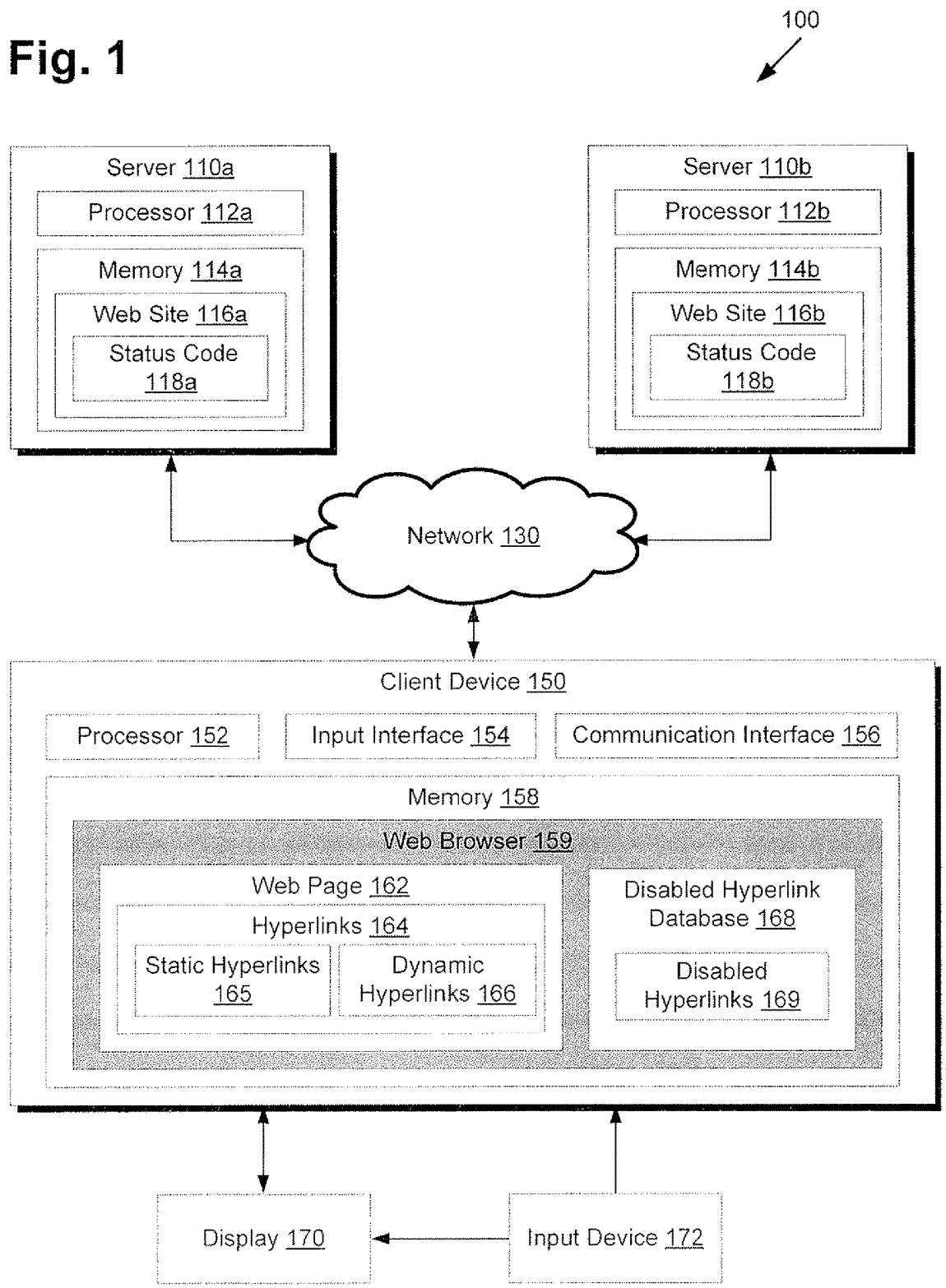
FIG. 1 presents a system for disabling or expiring hyperlinks, according to one implementation of the present disclosure.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for disabling or expiring hyperlinks, according to one implementation of the present disclosure. System 100 of FIG. 1 includes server 110a, server 110b, network 130, client device 150, display 170, and input device 172. Server 110a includes processor 112a, memory 114a, web site 116a, and status code 118a. Server 110b includes processor 112b, memory 114b, web site 116b, and status code 118b. Client device 150 includes processor 152, input interface 154, communication interface 156, and memory 158. Memory 158 includes web browser 159 which includes web page 162 and disabled hyperlink database 168. Web page 162 includes hyperlinks 164 including static hyperlinks 165 and dynamic hyperlinks 166. Disabled hyperlink database 168 includes disabled hyperlinks 169.

System 100 of FIG. 1 includes server 110a. Server 110a is configured to communicate with client device 150 over network 130. More specifically, server 110a provides web site 116a to client device 150 over network 130. In some implementations, server 110a may be configured to send web pages, such as web page 162, included in web site 116a for use on web browser 159 of user device 150 over network 130. Server 110a may send a web page included in web site 116a in response to a user selecting one of hyperlinks 164 in web browser 159. In addition, server 110a may provide updates or changes to web site 116a dynamically over time. Server 110a may be operated by a single service provider, or server 110a may be operated by any number of service providers. Server 110a is capable of hosting a web page and function as a web page server.

Server 110a includes processor 112a and memory 114a. Processor 112a may be configured to access memory 114a to execute web site 116a, or to execute other commands, processes, or programs stored in memory 114a. Processor 112a may also be configured to send web site 116a over network 130 to client device 150. Processor 112a may correspond to a processing device, such as a microprocessor or similar hardware processing device, or a plurality of hardware devices. Memory 114a is a hardware memory capable of storing web site 116a and other commands, processes, and programs for execution by processor 112a. Memory 114a may be hardware or software and may be instituted as ROM, RAM, flash memory, or any sufficient memory capable of storing a set of instructions. In other implementations, memory 114a may correspond to a plurality of memory types or modules.

Server 110a further includes web site 116a stored on memory 114a. Web site 116a may include one or a plurality of web pages, such as web page 162 of client device 150. A web page included on web site 116a is accessed in response to a request from web browser 159 operating on client device 150 over network 130. Once a web page of web site 116a is accessed by web browser 159 of client device 150, the web page may be stored on web browser 159 of client device 150.

For example, if a user enters an URL into web browser 159 in order to access web page 162 of web site 116a, server 110a may send web page 162 to web browser 159 over network 130 in response. Web browser 159 may then store web page 162 to allow the user to locally interact with web page 162 on client device 150. However, once the user interacts with an external link on web page 162, web browser 159 is required to access the external link. The external link may be a hyperlink, such as any of hyperlinks 164 that allow the user to navigate to another web page of web site 116a, another web site stored on server 110a, or another web site stored on another server, such as web site 116b of server 110b.

Web site 116a includes status code 118a. Status code 118a is a status code capable of disabling a broken and/or expired hyperlink of hyperlinks 164 on web browser 159 of client device 150. Status code 118a may be an HTTP status code to be included in the 4XX client error category of HTTP status codes. There are currently numerous 4XX client error category HTTP status codes, including 400 "Bad Request," 401 "Unauthorized," and 404 "Not Found" HTTP status codes. Each of these 4XX HTTP status codes provides an error code and message to the user on web browser 159.

For example, currently, in a scenario where the user selects one of hyperlinks 164 in order to access web page 162 on web site 116*a* of server 110*a*, and web page 162 is undiscoverable, server 110*a* would send a 404 "Not Found" status code to web browser 159 for display to the user. However, the 404 "Not Found" status code would not disable the one of hyperlinks 164, thus allowing the user to select the one of hyperlinks 164 on web page 162 and/or any other web page again at a later time, and ultimately receive the same 404 "Not Found" status code each time.

Status code 118*a* may become HTTP status code 460, for example, as there is currently no HTTP status code 460. For example, when the user selects one of hyperlinks 164 and is taken to an expired and/or non-existent web page, status code 118*a* may be sent to web browser 159 by server 110*a* with the message and code "HTTP 460 hyperlink disabled/expired," for example. It should be noted that status code 118*a* on server 110*a* is used purely as an example. In one implementation, the status code received by web browser 159 is generated by the server that is accessed based on the address of the one of hyperlinks 164.

In order for the one of hyperlinks 164 to be disabled in response to a status code, a solution may be included in web browser 159. For example, source code of web browser 159 will be programmed to recognize the status code and to implement a solution whereby the one of hyperlinks 164 which generated the status code from the server hosting the web page addressed by the one of hyperlinks 164 is disabled in response to web browser 159 receiving the status code from the server.

In some implementations, web browser 159 can be programmed to update disabled hyperlinks 169 in disabled hyperlink database 168 with the one of hyperlinks 164 to ensure the one of hyperlinks 164 is no longer selectable by the user in the future. For example, after web browser 159 receives status code 118*a* from server 110*a* in response to the user selecting the one of hyperlinks 164, the one of hyperlinks 164 is added to disabled hyperlinks 169. In some implementations, the one of hyperlinks 164 can be disabled on all web pages relating to any web sites, including web page 162 on web site 116*a*, to ensure that the one of hyperlinks 164 is disabled for all web pages accessed on web browser 159. As a result, when the user attempts to select the one of hyperlinks 164 on web page 162 or another web page at a later time, the one of hyperlinks 164 is either not selectable and/or when selected does not navigate to an address provided by the one of hyperlinks 164.

However, in another implementation, web browser 159 can be programmed to disable the one of hyperlinks 164 on web page 162 during the current display of web page 162 on web browser 159, while not updating disabled hyperlinks 169 in disabled hyperlink database 168. As a result, when the user navigates again to web page 162 or to any other web page including the one of hyperlinks 164, the one of hyperlinks 164 will again be enabled. In such an implementation, upon selection of the newly enabled one of hyperlinks 164 by the user, server 110*a* will again send status code 118*a* to web browser 159 and repeat the above process.

In yet another implementation, web browser 159 can be programmed to ask the user, in response to receiving status code 118*a*, if the user would like to disable the one of hyperlinks 164 on web page 162, add the one of hyperlinks 164 to disabled hyperlinks 169 in disabled hyperlink database 168, and/or to not disable the one of hyperlinks 164, permanently or for a pre-defined duration. For example, the address included in the one of hyperlinks 164 may be known to the user as an address to a web page is that is frequently offline or disabled, and thus the user may wish to keep the one of hyperlinks 164 enabled for selection at a later time.

System 100 of FIG. 1 further includes server 110*b*. It should be noted with respect to FIG. 1 that server 110*a*, processor 112*a*, memory 114*a*, web site 116*a*, and status code 118*a* are similar to server 110*b*, processor 112*b*, memory 114*b*, web site 116*b*, and status code 118*b*, respectively. For example, each of the listed components of server 110*a* may serve the same function and purpose as each of the components of server 110*b*.

However, server 110*a* and server 110*b* may be operated by different service providers, provide different content, and/or be operated by the same service provider. Service providers may be individuals, companies, blogs, forums, social media, email providers, or any other provider of web sites. For example, server 110*a* may be operated by COMPANY-1 while server 110*b* is operated by COMPANY-2. COMPANY-1 and COMPANY-2 may operate web site 116*a* and web site 116*b*, respectively, where web site 116*a* and web site 116*a* each include a plurality a web pages which can be accessed by hyperlinks 164 on web page 162, or any other web page.

Although the implementation of FIG. 1 includes only server 110*a* and server 110*b*, the present application is not limited to the implementation of FIG. 1. For example, in some implementations, only one server may be accessible by client device 150, or in other implementations, any number of servers may be accessible by client device 150 over network 130.

System 100 of FIG. 1 includes client device 150. Client device 150 may include a mobile phone, tablet, personal computer, or any other device capable of executing web browser 159.

Client device 150 of system 100 includes processor 152 and memory 158. Processor 152 may be configured to access memory 158 to execute web browser 159, or to execute other commands, processes, or programs stored in memory 158. Processor 152 may correspond to a processing device, such as a microprocessor or similar hardware processing device, or a plurality of hardware devices. Memory 158 is a hardware memory capable of storing web browser 159 and other commands, processes, and programs for execution by processor 152. Memory 158 may be hardware or software and may be instituted as ROM. RAM, flash memory, or any sufficient memory capable of storing a set of instructions. In other implementations, memory 158 may correspond to a plurality of memory types or modules.

Client device 150 of system 100 further includes communication interface 156. In the implementation of FIG. 1, communication interface 156 includes any device that is capable of both transmitting data with a transmitter and receiving data with a receiver. Processor 152 of client device 150 is thus configured to control communication interface 156 to communicate with other electronic devices, such as server 110*a* and server 110*b*. As such, communication interface 156 can utilize, for example, one or more of Wireless Fidelity (WIFI®), Worldwide Interoperability for Microwave Access (WIMAX®), ZIGBEE®, BLUETOOTH®, BLUETOOTH® low energy, Algorithm Division Multiple Access (CDMA), Evolution-Data Optimized (EV-DO), Global System for Mobile Communications (GSM), Long Term Evolution (LTE), and other types of wired and wireless technology.

Client device 150 of system 100 further includes input interface 154. Input interface 154 is configured to communicate with input device 172 and display 170. Input interface 154 may communicate with input device 172 and display 170 by a wired and/or a wireless connection. Processor 152 of client device 150 is thus configured to control input interface 154 to communicate with input device 172 and display 170. Input interface 154 can utilize, for example, Wireless Fidelity (WIFI®), (WIMAX®), ZIGBEE®, BLUETOOTH®, BLUETOOTH® low energy, GSM, LTE, and other types of wired and wireless technologies to communicate with input device 172 and display 170.

Client device 150 further includes web browser 159. Web browser 159 is configured to access, retrieve, display, communicate, and interact with web pages included on web sites, such as web page 162 from web site 116a. Web browser 159 is configured to utilize network 130 to access the World Wide Web (WWW) in order to communicate with service providers, such as server 110a and server 110b. Web browser 159 may include a graphical user interface for display to the user of client device 150. Web browser 159 may be any web browser capable of operation on client device 150. Web browser 159 may be, for example, a commercially available web browser 159. Web browser 159 may be stored in memory 158 of client device 150.

In some implementations, web browser 159, as discussed above, is configured to recognize a status code, such as status code 118a, and disable a hyperlink of hyperlinks 164 in response to receiving status code 118a. In such an implementation, the source code of web browser 159 is configured to recognize the status code and to implement a solution whereby the one of hyperlinks 164 is disabled in response to receiving the status code from the server accessed in response to the selection of the one of hyperlinks 164. For example, the solution in the source code of web browser 159 recognizes the source, identifies the one of hyperlinks 164 that generated the source code response, recognizes the one of hyperlinks 164 when web browser 159 encounters the one of hyperlinks 164 again, and disables, automatically or in response to user preference, the one of hyperlinks 164 in response to the encounter.

In some implementations, web browser 159 may be configured to include disabled hyperlink database 168 for storing the one of hyperlinks 164 in disabled hyperlinks 169 (disabled hyperlink database 168 will be discussed below in more detail). Web browser 159 may be configured to disable the hyperlinks stored in disabled hyperlinks 169 on all web pages accessed by web browser 159, even if disabled hyperlinks 169 were originally stored in response to a hyperlink from another web page.

As illustrated in FIG. 1, web browser 159 includes web page 162 and disabled hyperlink database 168. Web page 162 of web browser 159 is configured to be displayed on display 170 of client device 150. Web page 162 may be written in HTML, or another comparable markup language. Web page 162 is configured to be retrieved by web browser 159 from server 110a, server 110b, or any server hosting web page 162, for example. Web page 162 may be any web page, including an email, an informational, an interactive, a static, or a dynamic web page, for example.

Web page 162 is configured to include hyperlinks 164 and to receive dynamic updates to hyperlinks 164 during display of web page 162. For example, any of hyperlinks 164 may be activated, expired, or disabled during display of web page 162 in response to instructions from web browser 159. The instructions received by web page 162 from web browser 159 may be instructions implemented in the solution included in the source code of web browser 159, as described above.

As shown in FIG. 1, web page 162 includes hyperlinks 164 including static hyperlinks 165 and dynamic hyperlinks 166. Hyperlinks 164 may each reference an address or data that can be navigated to or retrieved in response to the user selecting hyperlinks 164. Hyperlinks 164 may reference an entire document, or may reference a specific location within a document. For example, one of hyperlinks 164 on web page 162, when selected, may navigate the user to another web page addressed by the one of hyperlinks 164, or may navigate the user to a specific location within web page 162.

In some implementations, hyperlinks 164 may replace web page 162 with a new web page, navigate to a different location on web page 162, and/or open web page 162 or a new web page in a different window. Hyperlinks 164 may be unidirectional, bidirectional, or include many-to-many links.

A selection of one of hyperlinks 164 may include a click on the one of hyperlinks 164, hovering over the one of hyperlinks 164, and/or automatic selection of the one of hyperlinks 164 in response to web page 162 being retrieved by web browser 159. For example, the user may click on the one of hyperlinks 164, the user may hover a mouse pointer over the one of hyperlinks 164, or in response to the user navigating to web page 162 the one of hyperlinks 164 may be automatically triggered.

Hyperlinks 164 include static hyperlinks 165 and/or dynamic hyperlinks 166. Both static hyperlinks 165 and dynamic hyperlinks 166 can be disabled in response to web browser 159 receiving a status code from a server, such as status code 118a from server 110a, for example. However, static hyperlinks 165 do not include source code for enabling, disabling, expiring, or activating static hyperlinks 165. As such, static hyperlinks 165 are generally not capable of dynamic change unless disabled by web browser 159 in response to a status code or in response to web browser 159 querying disabled hyperlink database 168 and determining that any of static hyperlinks 165 are included in disabled hyperlinks 169.

Dynamic hyperlinks 166 are configured to be dynamically changed on web page 162. Dynamic hyperlinks 166 may include source code for enabling, disabling, expiring, and/or activating dynamic hyperlinks 166 at a predetermined time or date, or in response to a certain event and/or trigger. For example, one of dynamic hyperlinks 166 may include an activation tag, an expiration tag, or both an activation and expiration tag in the source code of the one of dynamic hyperlinks 166.

Web browser 159 further includes disabled hyperlink database 168 which includes disabled hyperlinks 169. Disabled hyperlink database 168 is configured to store hyperlinks from hyperlinks 164 on web page 162 and any other hyperlinks visited by web browser 159. Specifically, disabled hyperlink database 168 is configured to store disabled hyperlinks 169 in response to receiving source code 118a, source code 118b, or a similar source code from another server, or in response to any hyperlinks on any web page becoming deactivated, disabled, or expired. Disabled hyperlink database 168 may be stored in web browser 159 and updated dynamically as new hyperlinks, such as any of hyperlinks 164, become disabled.

In some implementations, network 130 may include a local area network. In such an implementation, disabled hyperlinks 169 stored in disabled hyperlink database 168 can be shared among all web browsers operating on client devices connected to network 130. In return, each other disabled hyperlink database of each other client device connected to network 130 can dynamically update each other disabled hyperlink database associated with each web browser, including updating disabled hyperlink database 168 of web browser 159.

For example, if one of dynamic hyperlinks 166 on web page 162 is deactivated and thus becomes disabled, disabled hyperlink database 168 may store the one of dynamic hyperlinks 166 in disabled hyperlinks 169 of disabled hyperlink database 168. In another example, when one of hyperlinks 164 is selected and receives a status code, such as status code 118a, in response, the one of hyperlinks 164 is disabled by the source code solution included in the source code of web browser 159. As a result, the one of hyperlinks 164 is stored in disabled hyperlinks 169 of disabled hyperlink database 168. Using disabled hyperlinks 169 of disabled hyperlink database 168, web browser 159 is configured to disable any of disabled hyperlinks 169 if they are later encountered on any web page, email, or application, including web page 162.

System 100 of FIG. 1 further includes display 170. Display 170 is configured to display web page 162 to the user. Display 170 may communicate with client device 150 through input interface 154. Display 170 may comprise a liquid crystal display ("LCD"), a light-emitting diode ("LED"), an organic light-emitting diode ("OLED"), or another suitable display screen that performs a physical transformation of signals to light. In the present implementation, display 170 is connected externally to client device 150. However, in other implementations, display 160 may be built into client device 150 and be configured for touch recognition. In such an implementation, display 170 is at least one of the devices making up input device 172.

System 100 of FIG. 1 further includes input device 172. Input device 172 may include any devices necessary for interacting with client device 150 and/or display 170. For example, input device 172 may include a keyboard, a microphone, a mouse, a headset, a display, or any other device. In the present implementation, input device 172 connected externally to client device 150. However, in some implementations, input device 172 may be built into client device 150.

System 100 of FIG. 1 further includes network 130. Network 130 provides data communications between connected devices, which in system 100 includes server 110a, server 110b, and client device 150. Specifically, network 130 is configured to transmit web site 116a and 116b from server 110a and server 110b, respectively, to web browser 159 of client device 150. In addition, network 130 is configured to transmit requests for web pages, such as web page 162, to web site 116a and web site 116b. Further, network 130 is configured to transmit a request for web pages from server 110a, server 110b, or any server in response to the user selecting one of hyperlinks 164 on client device 150. Network 130 is further configured to transmit status code 118a and status code 118b from server 110a and server 110b, respectively, to web browser 159 on client device 150. Although network 130 could represent a proprietary closed network, network 130 may also be a publicly accessible network such as the Internet, providing a wide area of coverage for client devices at diverse locations. Additionally, network 130 may be a computer network, such as a local area network.

FIG. 2A presents an example of a hyperlink HTML code, according to one implementation of the present disclosure. Dynamic hyperlink 266a of FIG. 2A includes link code 281a, expiration tag 282a, and title 284a. It should be noted with respect to FIG. 2A that dynamic hyperlink 266a corresponds to one of dynamic hyperlinks 166 of FIG. 1.

Dynamic hyperlink 266a includes link code 281a. Link code 281a is configured to specify the destination address for dynamic hyperlink 266a. For example, when a user selects dynamic hyperlink 266a, the web browser navigates to the destination address provided in link code 281a. Dynamic hyperlink 266a includes destination address "http://phones.com/phone" and thus would take the user to "http://phones.com/phone" upon selection of dynamic hyperlink 266a so long as an expiration time included in expiration tag 282a had not been reached (expiration tag 282a will be described in more detail below).

Dynamic hyperlink 266a further includes expiration tag 282a. Expiration tag 282a is configured to expire dynamic hyperlink 266a at an expiration time. For example, once the expiration time included in expiration tag 282a is reached, dynamic hyperlink 266a is no longer selectable by the user. In some implementations, once dynamic hyperlink 266a expires in response to expiration time being reached, dynamic hyperlink 266a may become invisible, fade away, and/or no longer selectable on the display.

In the present implementation, expiration tag 282a is configured to expire dynamic hyperlink 266a on Oct. 2, 2014, at 16:59:59 General Mountain Time (GMT). As such, once Oct. 2, 2014, at 16:59:59 GMT occurs, expiration tag 262a is configured to expire dynamic hyperlink 266a so that dynamic hyperlink 266a is no longer selectable by the user.

In the present implementation, expiration tag 282a is provided in standard JavaScript date format. However, in other implementations, expiration tag 282a may be provided in any suitable date format. For example, the date format of expiration tag 282a may be dependent on the source code of the web browser, such as web browser 159, such that the web browser is able to recognize expiration tag 282a and generate a solution to expiration tag 282a for expiring dynamic hyperlink 266a.

Dynamic hyperlink 266a further includes title 284a. Title 284a is configured to include the text of dynamic hyperlink 266a that is to be displayed on the web page. For example, when dynamic hyperlink 266a is displayed on the web page in the web browser, such as web page 162 in web browser 159, the text of title 284a is all that is displayed. As such, when the user selects dynamic hyperlink 266a, the user is selecting the text of title 284a displayed on the web page.

In the present implementation, title 284a of dynamic hyperlink 266a includes the text "Great deal for PHONE, Expires at 10/02 05:00 PM." As such, "Great deal for PHONE, Expires at 10/02 05:00 PM" is displayed as dynamic hyperlink 266a on the web page.

Title 284a may be configured to display the text underlined, bolded, in color, italicized, and/or any desired configuration. Title 284a can thus be included in the source code of dynamic hyperlink 266a with the necessary source code depending on the desired configuration. However, in some implementations, dynamic hyperlink 266a may be configured to be displayed as an icon, a button, or any other configuration capable of selection by the user.

FIG. 2B presents another example of a hyperlink HTML code, according to one implementation of the present disclosure. Dynamic hyperlink 266b of FIG. 2B includes link code 281b, activation tag 286b, and title 284b. It should be noted with respect to FIG. 2B that dynamic hyperlink 266b corresponds to one of dynamic hyperlinks 166 of FIG. 1. It should further be noted that link code 281b of FIG. 2B is similar to link code 281a of FIG. 2A.

Dynamic hyperlink 266b includes activation tag 286b. Activation tag 286b is configured to activate dynamic hyperlink 266b at an activation time. For example, once the activation time included in activation tag 286b is reached, dynamic hyperlink 266h becomes selectable by the user. In some implementations, before dynamic hyperlink 266b activates in response to the activation time being reached, dynamic hyperlink 266b may be invisible, faded, and/or not selectable on the display.

In the present implementation, activation tag 286b is configured to activate dynamic hyperlink 266b on Sep. 18, 2014, at 09:00:00 GMT. As such, once Sep. 18, 2014, at 09:00:00 GMT occurs, activation tag 286b is configured to activate dynamic hyperlink 266b so that dynamic hyperlink 266b is selectable by the user.

In the present implementation, activation tag 286b is provided in standard JavaScript date format. However, in other implementations, activation tag 286b may be provided in any suitable date format. For example, the date format of activation tag 286b may be dependent on the source code of the web browser, such as web browser 159, such that the web browser is able to recognize activation tag 286b and generate a solution to activation tag 286b for activating dynamic hyperlink 266b.

Dynamic hyperlink 266b further includes title 284b. It should be noted that title 284b is similar to title 284a of FIG. 2A, except title 284b of dynamic hyperlink 266b includes the text "PHONE sale goes live at 9/18 09:00 A.M." As such, "PHONE sale goes live at 9/18 09:00 AM" is displayed as dynamic hyperlink 266b on the web page.

Figure 2C:
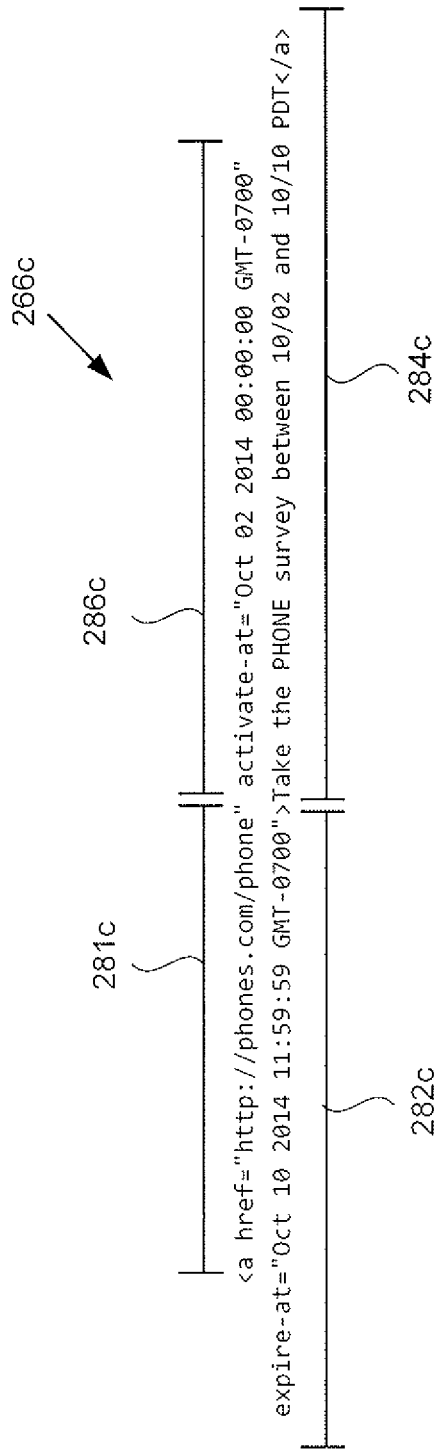
FIG. 2C presents another example of a hyperlink HTML code, according to one implementation of the present disclosure.

FIG. 2C presents another example of a hyperlink HTML code, according to one implementation of the present disclosure. Dynamic hyperlink 266c of FIG. 2C includes link code 281c, expiration tag 282c, activation tag 286c, and title 284c. It should be noted with respect to FIG. 2C that dynamic hyperlink 266c corresponds to one of dynamic hyperlinks 166 of FIG. 1. It should further be noted that link code 281c of FIG. 2C is similar to link code 281a of FIG. 2A and link code 281b of FIG. 2B.

Dynamic hyperlink 266c includes activation tag 286c. It should be noted that activation tag 286 is similar to activation tag 286b of FIG. 2B except activation tag 286c is configured to activate dynamic hyperlink 266c on Oct. 2, 2014, at 0:00:00 GMT. As such, once Oct. 2, 2014, at 0:00:00 GMT occurs, activation tag 286c is configured to activate dynamic hyperlink 266c so that dynamic hyperlink 266c is selectable by the user.

Dynamic hyperlink 266c further includes expiration tag 282c. It should be noted that expiration tag 282c is similar to expiration tag 282a of FIG. 2A except expiration tag 282c is configured to expire dynamic hyperlink 266c on Oct. 10, 2014, at 11:59:59 GMT. As such, once Oct. 10, 2014, at 1:59:59 GMT occurs, expiration tag 282c is configured to expire dynamic hyperlink 266c so that dynamic hyperlink 266c is no longer selectable by the user.

Therefore, by including activation tag 286c and expiration 282c in dynamic hyperlink 266c, dynamic hyperlink 266c is only selectable by the user between Oct. 2, 2014, at 0:00:00 GMT, and Oct. 10, 2014, at 11:59:59 GMT.

Dynamic hyperlink 266c further includes title 284c. It should be noted that title 284c is similar to title 284a of FIG. 2A and title 284b of FIG. 2B, except title 284c of dynamic hyperlink 266c includes the text "Take the PHONE survey between 10/02 and 10/10 PDT." As such, "Take the PHONE survey between 10/02 and 10/10 PDT" is displayed as dynamic hyperlink 266c on the web page.

Figure 3:
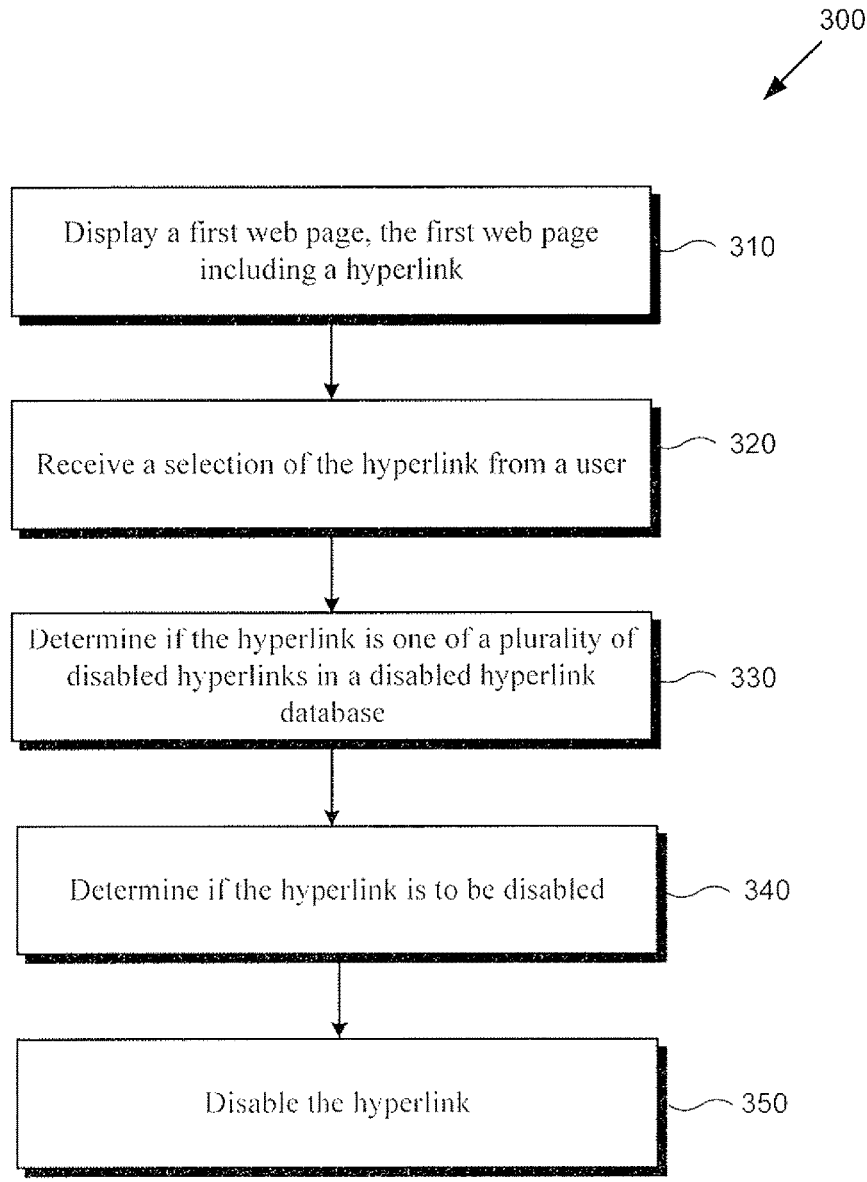
FIG. 3 presents a flowchart illustrating a method for disabling or expiring hyperlinks, according to one implementation of the present disclosure.

FIG. 3 presents a flowchart illustrating a method for disabling or expiring hyperlinks, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 1, the disclosed inventive concepts are not intended to be limited by specific features shown and described with respect to FIG. 1. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 (at 310) includes displaying a first web page the first web page including a hyperlink. For example, web page 162 including one of hyperlinks 164 may be displayed on web browser 159 of client device 150. Web page 162 may be retrieved over network 130 from web site 116a of server 110a or web site 116b of server 110b, for example. Web page 162 includes hyperlinks 164 for display on display 170. One of hyperlinks 164 may be included in dynamic hyperlinks 166 and thus include an activation tag and/or an expiration tag, such as activation tag 286b of FIG. 2B or expiration tag 282a of FIG. 2A.

In some embodiments, however, a first web page may not be displayed. In such an embodiment, a hyperlink may be included in an email, an application, or another suitable platform configured to interact with hyperlinks.

Referring to flowchart 300 of FIG. 3, flowchart 300 (at 320) includes receiving a selection the hyperlink from a user. For example, client device 150 receives a selection of one of hyperlinks 164 from the user on client device 150. The selection of the one of hyperlinks 164 may come from web page 162 on client device 150. However, in an alternative embodiment, the selection of the hyperlink may come from an email or an application on client device 50, for example, and not from web page 162. The user may select the one of hyperlinks 164 so long as the one of hyperlinks 164 is enabled.

With reference to flowchart 300 of FIG. 3, flowchart 300 (at 330) includes determining if the hyperlink is one of a plurality of disabled hyperlinks in a disabled hyperlink database. For example, web browser 159 of client device 150 determines if the selected hyperlink of hyperlinks 164 is one of disabled hyperlinks 169 in disabled hyperlink database 168. Web browser 159 may query disabled hyperlink database 168 with the selected hyperlink of hyperlinks 164 to determine if the selected hyperlink is included in disabled hyperlinks 169.

Referring to flowchart 300 of FIG. 3, flowchart 300 (at 340) includes determining if the hyperlink is to be disabled. For example, after the one of hyperlinks 164 is selected by the user, web browser 159 of client device 150 determines if the one of hyperlinks 164 is to be disabled. The determining if the one of hyperlinks 164 is to be disabled is dependent on whether the one of hyperlinks 164 is included in static hyperlinks 165 or if the one of hyperlinks 164 is one of dynamic hyperlinks 166 and has been disabled by an expiration tag being triggered and/or an activation tag not yet being triggered.

In an implementation where the one of hyperlinks 164 is included in static hyperlinks 165, the one of hyperlinks 164 does not include an activation tag or an expiration tag and thus should not be disabled unless web browser 159 of client device 150 has previously received status code 118*a* from server 110*a*, for example. In such an implementation, web browser 159 may determine, in response to receiving status code 118*a*, that the one of hyperlinks 164 is to be disabled.

In some implementations, status code 118*a* may be a disable hyperlink status code. Web browser 159 includes source code configured to recognize status code 118*a* and to implement a solution to disable the one of hyperlinks 164 in response to recognizing status code 118*a*. Web browser 159 may receive an error code from server 110*a*, for example, in response to status code 118*a* being sent by server 110*a*.

For example, web browser 159, in response to the user selecting the one of hyperlinks 164, may request the web page addressed by the one of hyperlinks 164 from the server hosting the web page addressed by the one of hyperlinks 164. In response, web browser 159 may receive from the server hosting the web page an error code if the web page is not discoverable or no longer exists. As a result, web browser 159 may store the one of hyperlinks 164 in disabled hyperlink database 168. In such an example, web browser 159 has determined that the one of hyperlinks 164 is to be disabled.

In some implementations, web browser 159 updates disabled hyperlink database 168 with the one of hyperlinks 164 that generated the error code. For example, web browser 159 of client device 150 may update disabled hyperlink database 168 with the one of hyperlinks 164 in response to receiving status code 118*a* from the server hosting the web page addressed by the one of hyperlinks 164.

In another implementation, where the one of hyperlinks 164 is included in dynamic hyperlinks 166, the one of hyperlinks 164 may include an activation tag indicative of an activation time and/or an expiration tag indicative of an expiration time. In such an implementation, web browser 159 disables the one of hyperlinks before the activation time and/or after the expiration time.

Turning back to flowchart 300 of FIG. 3, flowchart 300 (at 350) includes disabling the hyperlink. For example, in response to determining that the one of hyperlinks 164 is to be disabled, web browser 159 disables the one of hyperlinks 164. In another example, in response to querying disabled hyperlink database 168 and determining that the one of hyperlinks 164 is included in disabled hyperlinks 169, web browser 159 disables the one of hyperlinks 164.

In yet another implementation, in response to receiving status code 118*a*, for example, or any other error code from another server hosting the web page addressed by the one of hyperlinks 164, web browser 159 disables the one of hyperlinks 164. Once the one of hyperlinks 164 is disabled, the one of hyperlinks 164 may become invisible, fade away, and/or no longer be selectable by the user, for example.

In implementations where the one of hyperlinks 164 includes an activation tag indicative of an activation time, such as activation tag 286*b* of FIG. 2B, the one of hyperlinks 164 is disabled until the activation time is reached. In response to the activation time being reached, the one of hyperlinks 164 is enabled.

In implementations where the one of hyperlinks 164 includes an expiration tag indicative of an expiration time, such as expiration tag 282*a* of FIG. 2A, the one of hyperlinks 164 is disabled after the expiration time is reached.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a client device having a processor and a memory configured to store a web browser and a database of disabled hyperlinks, the method comprising:
   receiving, using the processor, a selection of a hyperlink from a user for navigating to a web page addressed by the hyperlink;
   determining if the hyperlink includes an expiration tag indicative of an expiration time and an activation tag indicative of an activation time, wherein the activation time includes a first predetermined time and the expiration time includes a second predetermined time;
   in response to determining the hyperlink does not include the expiration tag and the activation tag:
      querying the database to determine if the hyperlink is one of the disabled hyperlinks stored in the database; and
      if querying determines that the hyperlink is not one of the disabled hyperlinks stored in the database:
         requesting, using the processor and in response to the selection, the web page from a web page server hosting the web page;
         receiving, using the processor and in response to the request, an error code from the web page server hosting the web page;
         storing, using the processor, the hyperlink in the database of the disabled hyperlinks, in response to receiving the error code; and
         disabling the hyperlink, using the processor, in response to receiving the error code;
      if the query determines that the hyperlink is one of the disabled hyperlinks stored in the database due to previously receiving the error code in response to a previous request for navigation to the web page addressed by the hyperlink:
         preventing, using the processor and in response to the selection, navigation to the web page addressed by the hyperlink;
   in response to determining the hyperlink includes the expiration tag and the activation tag:
      determine if the expiration time has been reached; and
      disable the hyperlink, in response to determining that the expiration time has been reached.

2. The method of claim 1 further comprising:
   in response to determining the hyperlink includes the expiration tag and the activation tag, determining if the activation time has been reached;
   activating the hyperlink, in response to determining that the activation time has been reached.

3. The method of claim 1, wherein prior to receiving the selection of the hyperlink from the user, the method comprises:
   displaying a first web page, the first web page including the hyperlink.

4. The method of claim 1, wherein in response to disabling the hyperlink, the hyperlink is made at least one of invisible and no longer selectable on a display.

5. A client device comprising:
a memory configured to store a web browser, the web browser including a database of disabled hyperlinks; and
a processor configured to execute the web browser to:
receive a selection of a hyperlink from a user for navigating to a web page addressed by the hyperlink;
determine if the hyperlink includes an expiration tag indicative of an expiration time and an activation tag indicative of an activation time, wherein the activation time includes a first predetermined time and the expiration time includes a second predetermined time;
in response to determining the hyperlink does not include the expiration tag and the activation tag:
query the database to determine if the hyperlink is one of the disabled hyperlinks stored in the database; and
if the query determines that the hyperlink is not one of the disabled hyperlinks stored in the database:
request, in response to the selection, the web page from a web page server hosting the web page;
receive, in response to the request, an error code from the web page server hosting the web page;
store the hyperlink in the database of the disabled hyperlinks, in response to receiving the error code; and
disable the hyperlink, in response to receiving the error code;
if the query determines that the hyperlink is one of the disabled hyperlinks stored in the database due to previously receiving the error code in response to a previous request for navigation to the web page addressed by the hyperlink:
prevent, in response to the selection, navigation to the web page addressed by the hyperlink;
in response to determining the hyperlink includes the expiration tag and the activation tag:
determine if the expiration time has been reached; and
disable the hyperlink, in response to determining that the expiration time has been reached.

6. The client device of claim 5, wherein prior to receiving the selection of the hyperlink from the user, the processor is configured to execute the web browser to:
display a first web page, the first web page including the hyperlink.

7. The client device of claim 5, wherein the client device is a part of a computer network, and wherein the disabling of the hyperlink disables the hyperlink on one or more other web browsers of other client devices on the computer network.

8. The client device of claim 7, wherein the computer network is a local area network.

9. A client device comprising:
a memory configured to store a web browser and a database of disabled hyperlinks; and
a processor configured to execute the web browser to:
receive a selection of a hyperlink from a user for navigating to a web page addressed by the hyperlink;
determine if the hyperlink includes an expiration tag indicative of an expiration time and an activation tag indicative of an activation time, wherein the activation time includes a first predetermined time and the expiration time includes a second predetermined time;
in response to determining the hyperlink does not include the expiration tag and the activation tag:
query the database to determine if the hyperlink is one of the disabled hyperlinks stored in the database; and
if the query determines that the hyperlink is not one of the disabled hyperlinks stored in the database:
request, in response to the selection, the web page from a web page server hosting the web page;
receive, in response to the request, an error code from the web page server hosting the web page;
store the hyperlink in the database of the disabled hyperlinks, in response to receiving the error code; and
disable the hyperlink, in response to receiving the error code;
if the query determines that the hyperlink is one of the disabled hyperlinks stored in the database due to previously receiving the error code in response to a previous request for navigation to the web page addressed by the hyperlink:
prevent, in response to the selection, navigation to the web page addressed by the hyperlink;
in response to determining the hyperlink includes the expiration tag and the activation tag:
determine if the expiration time has been reached; and
disable the hyperlink, in response to determining that the expiration time has been reached.

10. The client device of claim 1, wherein the processor is configured to execute the web browser to:
in response to determining the hyperlink includes the expiration tag and the activation tag, determine if the activation time has been reached;
activate the hyperlink, in response to determining that the activation time has been reached.

11. The client device of claim 1, wherein prior to receiving the selection of the hyperlink from the user, the processor is configured to execute the web browser to:
display a first web page, the first web page including the hyperlink.

12. The client device of claim 1, wherein the processor is configured to execute the web browser to make the hyperlink at least one of invisible and no longer selectable on a display in response to disabling the hyperlink.

13. The client device of claim 1, wherein the client device is a part of a computer network, and wherein the disabling of the hyperlink disables the hyperlink on one or more other web browsers of other client devices on the computer network.

14. The client device of claim 13, wherein the computer network is a local area network.

15. The client device of claim 1, wherein the activation tag is configured to activate the hyperlink at the first time, and wherein before reaching the first time the hyperlink is at least one of invisible, faded, and not selectable.

16. The client device of claim 15, wherein when the first time included in the activation tag is reached, the hyperlink becomes selectable by the user.

* * * * *